March 3, 1953 N. L. OATES 2,630,208
FISH ADVANCING MEANS
Filed Feb. 15, 1949 5 Sheets-Sheet 2

INVENTOR.
NORFORD L. OATES
BY
Reynolds Beach
ATTORNEYS

March 3, 1953
N. L. OATES
2,630,208
FISH ADVANCING MEANS
Filed Feb. 15, 1949
5 Sheets-Sheet 3
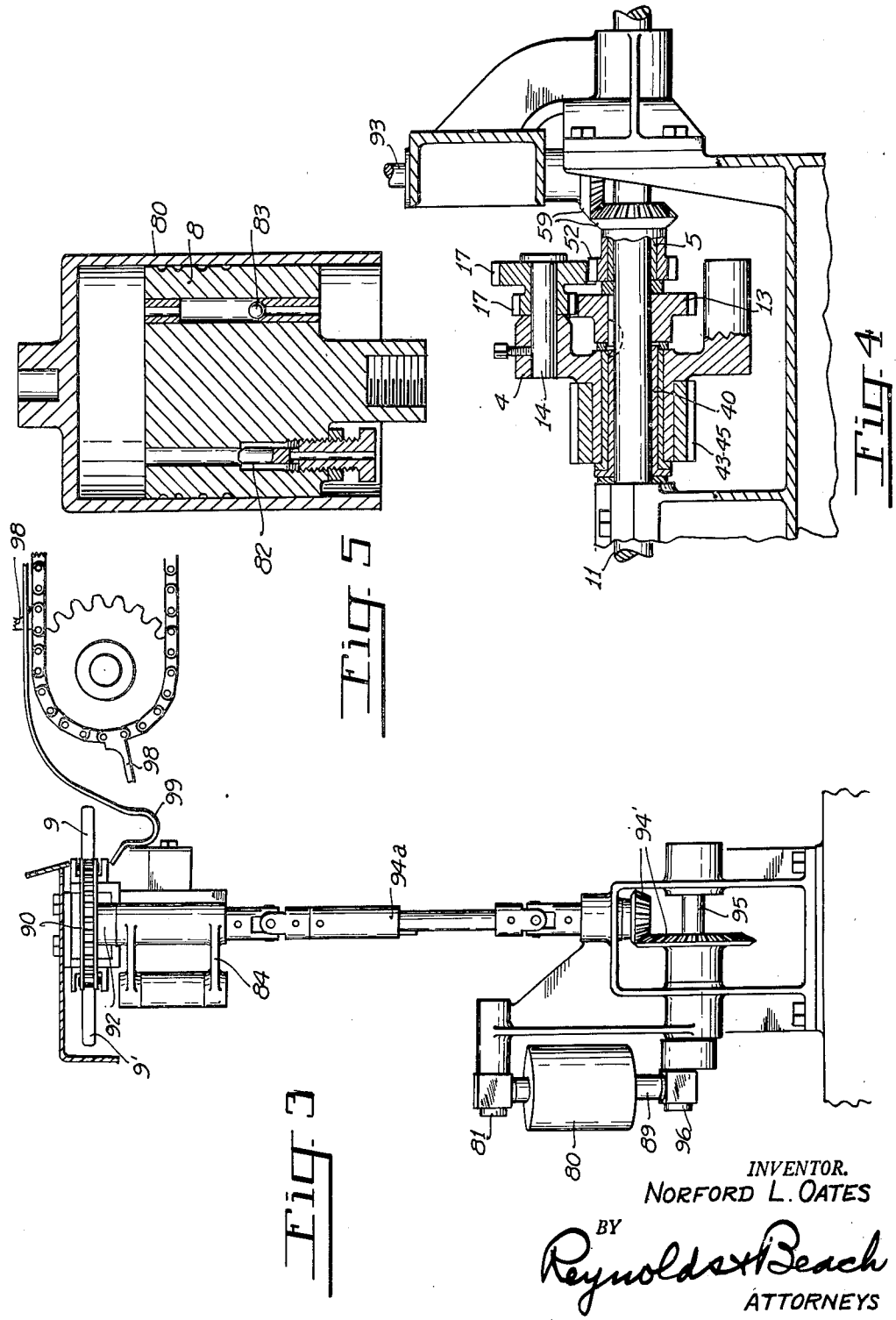
INVENTOR.
NORFORD L. OATES
BY
Reynolds+Beach
ATTORNEYS

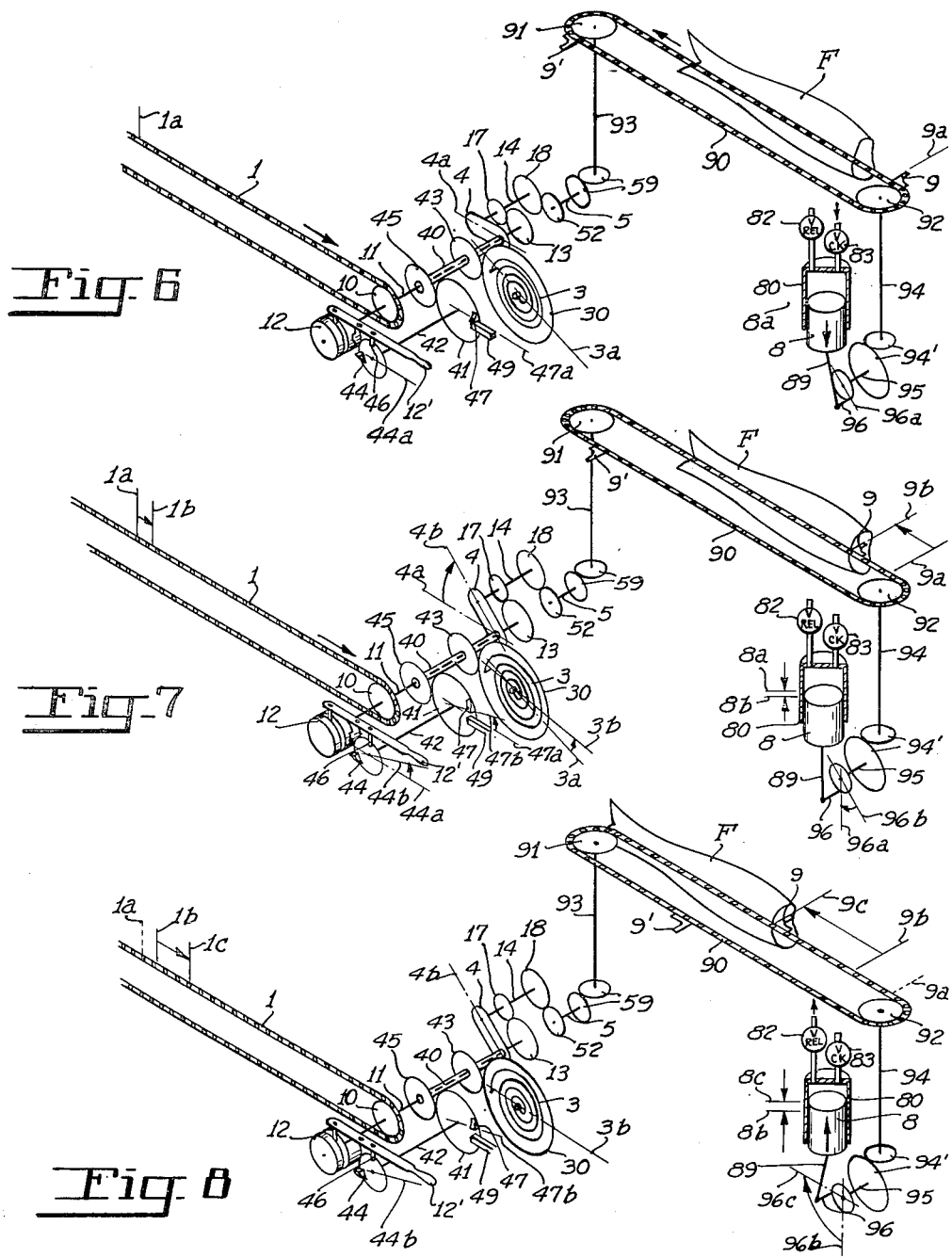

March 3, 1953 — N. L. OATES — 2,630,208

FISH ADVANCING MEANS

Filed Feb. 15, 1949 — 5 Sheets-Sheet 5

INVENTOR.
NORFORD L. OATES

BY Reynolds & Beach
ATTORNEYS

Patented Mar. 3, 1953

2,630,208

UNITED STATES PATENT OFFICE 2,630,208

FISH ADVANCING MEANS

Norford L. Oates, Seattle, Wash., assignor to Smith Cannery Machines Company, Seattle, Wash., a corporation of Washington Application February 15, 1949, Serial No. 76,570

7 Claims. (Cl. 198—203)

The present invention relates generally to fish dressing machines, of such types as are shown in patents to Waugh, No. 1,542,196, dated June 16, 1925; No. 1,459,273, dated June 19, 1923; No. 1,365,575, dated January 11, 1921, and No. 1,360,064, dated November 23, 1920, known to the trade as Iron Chinks.

More particularly the invention concerns the transfer of fish from a feed table, such as is shown in patents to Waugh, as in the above Patent No. 1,542,196, or in his Patent No. 1,909,643, dated May 16, 1933; or in the patent to Oates, No. 2,346,935, dated April 19, 1944; or in my own copending application Serial No. 782,865, filed October 29, 1947, to a fish dressing machine of the type already indicated.

Machinery of the nature indicated above is capable of handling salmon at speeds commonly in the vicinity of one hundred twenty fish a minute, but sometimes reaching a maximum of one hundred fifty fish a minute. The fish, however, vary appreciably in size, from as low as six or eight pounds up to twenty-six or thirty pounds. While the extreme range of sizes may not occur in a given run, there will be a very appreciable variation, nevertheless, in the successive individual fish being handled during a day's run. Moreover, the condition of the individual fish will vary, principally in accordance with the time they have been out of water, or sometimes dependent upon whether they are frozen or not. Sometimes a given fish will be stiff, another fish may be limber, and still another may be soft and flabby. Their surface condition, too, varies; some will be very sticky, and others quite slippery.

The fish are individually and positively advanced along the feed table in definitely spaced relationship, each disposed transversely of the direction of advance, during their advance being beheaded, and finally are delivered, each with the fresh neck cut at a definite location, belly up, in a trough at the terminus of the feed table. At this point they are free of the feed table's fish-advancing means, and must now be advanced tail first along the trough, to present first their tail at a pick-up point in position to be engaged by positive fish engaging means incorporated in the rotative bull ring of the fish dressing machine. Upon being so engaged the fish is lifted by its tail, with its body depending, until it lies along and is pinned to the bull ring, and is lifted clear of the trough. Because of the high speed of operation, the necessity of changing direction, and the tendency of some fish, once stopped, to stick and resist initiation of movement, particularly in a new direction, gravity can not be relied upon to advance the fish along the trough to the bull ring, but instead it has been proposed heretofore to employ positive means such as a lug projecting into and movable lengthwise of the trough, to engage behind each fish at the neck cut and to advance it positively toward the fish dressing machine. Mechanism to that end is disclosed in my copending application Serial No. 5,817, now Patent No. 2,585,267, filed February 2, 1948. As can well be understood, careful coordination and timing is required between the bull ring's fish-engaging means, the feed table's fish-delivering means, and the trough's fish-advancing means, and is obtained by driving all such means in a positive manner, one from another or all from a common power source, in synchronous relationship.

It will be realized that each fish is beheaded as it advances along the feed table, and that each neck cut lies at a definite location relative to one edge of the feed table. When each fish drops into the trough the neck cut of each will lie at a definite location, but their tails will lie at locations which will vary in spacing in advance of the pick-up point in accordance with the length of the individual fish. The tails of the shortest fish will be nearest the definitely positioned neck cut, but farthest from and must be advanced the greatest distance to the pick-up point, and the tails of the longest fish will be nearest the pick-up point, and need be advanced through the shortest distance thereto. The fish-advancing lug will engage each fish at the neck cut, hence at a point in its advance which is always at a definite distance from the pick-up point, but since it must advance tailwards towards the pick-up point, in the time interval before the fish-engaging means of the fish-dressing machine arrives there, through a sufficient distance to insure the prior arrival and halting by engagement of the tail of even the smallest fish, it becomes obvious that a long fish will arrive there and be halted some time before a short fish is so halted. The lug which is advancing such a long fish must itself halt, even though with a small fish it would not, for otherwise it would merely tend to double up or disengage the fish. Inherently resiliently yieldable means have heretofore been incorporated between the lug and the positive drive therefor, with the intention that these yieldable means will permit the lug to halt when the longer fish are thus halted, and yet by the resilient effect will cause the lug to "catch up," and thus will restore it to its proper cyclic coordination with the drive, after the halted fish has been removed by the bull ring, and before the lug must engage another fish. Means to this end are explained in detail in the copending application, Serial No. 5,817, now Patent No. 2,585,267, and such resiliently yieldable means are employed herein.

In theory, and in practice if the variation in size and condition of the fish is not great, this arrangement will operate quite satisfactorily.

Still, the actual force active to advance the fish is not lessened, but merely is divided in varying ratios between a positive force and a complemental resilient force, and the halting of each lug is predicated on its engaged fish possessing sufficient stiffness to transmit the halting force acting at its tail to the pushing or advancing force acting at its neck cut. The fish do not always possess the requisite stiffness, with the frequent result that the fish is doubled up, sometimes to an extent to flip it out of the trough, its engagement by the fish-engaging means of the bull ring is prevented or is imperfect, and malfunctioning throughout the succeeding fish-dressing operation is a result, with possible loss of or damage to a large fish, or a jam which shuts down the entire operation. Such losses are sufficiently frequent and expensive that it becomes highly desirable to provide means to avoid them, and that is the general object of this invention.

Somewhat more specifically, it is an object to provide positive means to advance each fish along the trough, coordinated in correct cyclic relationship to the fish-advancing means of the feed table and to the fish-engaging means of the bull ring, which will accommodate itself automatically to fish of widely varying sizes, which upon being halted will impose only a minimum buckling force upon the fish, insufficient to buckle even the most flabby fish, and which after being halted, and after the fish has been removed by the bull ring, will "catch up" by inherent resilient means to the intended cyclic relationship before it must again engage another fish.

Differently expressed, it is an object to interpose a resistance, in the nature of a braking force, to the advance of each lug, commencing at or soon after the time it engages a fish at the neck cut, and regardless of the length of the fish so engaged, which braking resistance is opposed to the resilient force and is of a value just enough less than the latter that, while advance of the fish is slowed down, such advance will not halt until the resisting braking force is augmented by the slight force transmitted through the fish itself upon its halting at the pick-up point. Neither will the fish lag so far behind as to fail to arrive in time at the pickup point. Additionally, it is an object to remove or destroy such braking force at the proper cyclic point, leaving the lug to the influence of the accumulated resilient force, acting in addition to its own positive drive means, to cause the lug to speed up its advance—the fish by now having been removed—and to resume its intended cyclic relationship to the fish-delivering means and to the fish-removing means.

More specific objects, such as the provision of safety throw-out means, of adjustments to accommodate different average sizes of fish, and the like, and dealing more specifically with the mechanism employed, will all be clear before the end of this specification is reached.

This invention has for its environment the feed table and its fish-delivering means, the fish-dressing machine and its fish-removing means, the feed trough, and the common drive means, including the resilient means, but the invention is understood to reside not in these elements nor in their particular form, but rather in the braking or resistance means and in its coordination and arrangement with relation to the aforesaid elements, the latter considered in their broad sense and application.

In the accompanying drawings the invention is shown embodied in a typical and preferred form, but it will be understood that the principles of the invention may be embodied in various forms, and that the one chosen for illustration is not intended to restrict applicant's invention to this particular form.

Figure 3 is an end elevation, looking in the sense of the fish's advance along the trough.

Figure 4 is a detail sectional view, along the line 4—4 of Figure 1.

Figure 5 is a detail sectional view axially of the braking dashpot.

Figure 1:
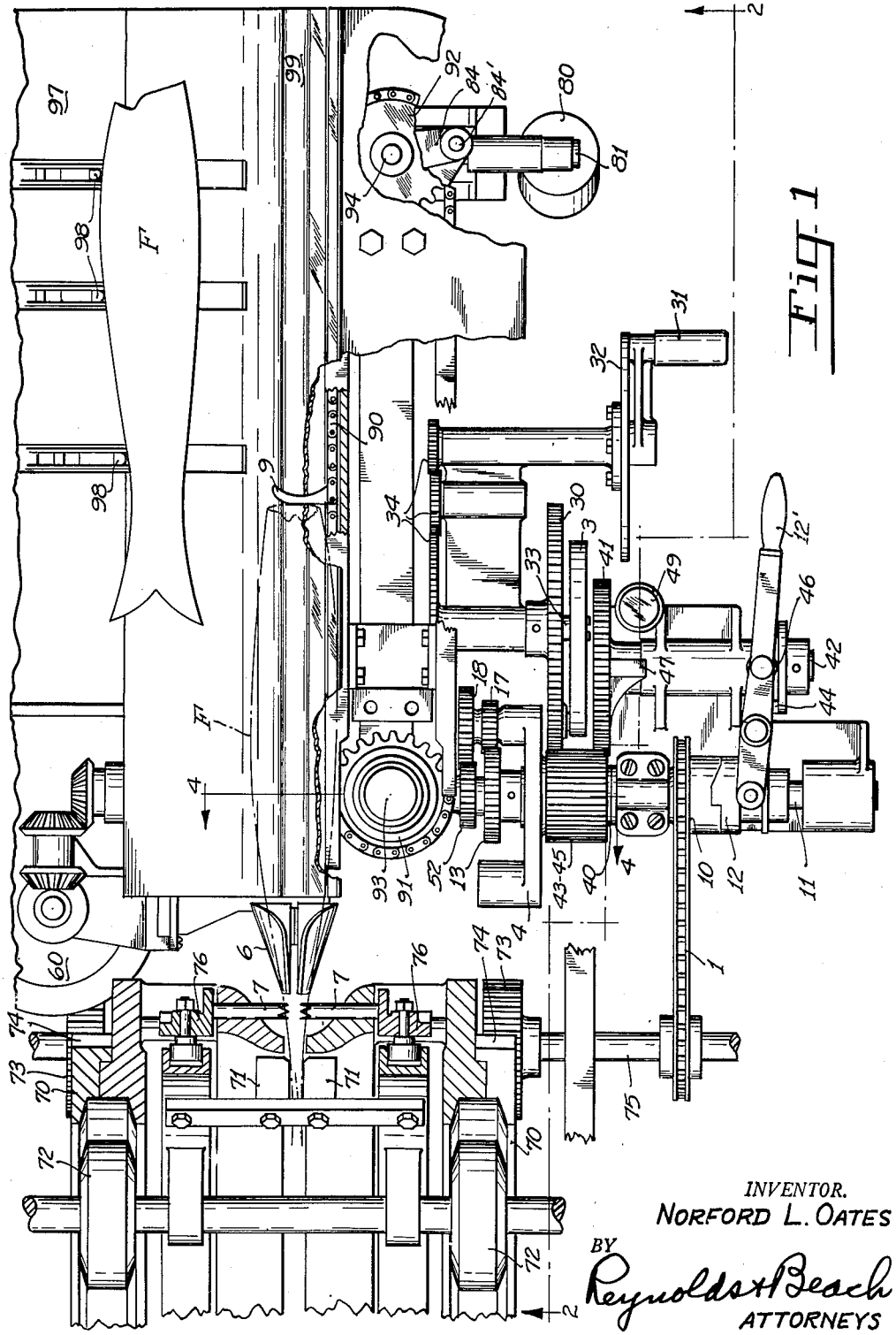
Figure 1 is a general plan view of the mechanism and associated elements.

Figures 6 to 11 inclusive are diagrams illustrating successive steps in the operation of the mechanism in handling a typical fish.

It is believed that the invention can be most readily grasped by reference first to the sequence diagrams, Figures 6 to 11 inclusive. In these diagrams such mechanism as the feed table itself and its terminal trough, the bull ring, with the exception of certain fish engaging means forming part thereof, and all nonessential mechanism having to do with the fish advancing means have been omitted, and the fish advancing means and associated mechanism have been shown diagrammatically, rather than strictly in accordance with the mechanical forms illustrated in the remaining figures.

In Figure 6 a fish F has just been released by the fish-delivering means 98 (see Figure 1) of the feed table, and delivered within the terminal trough 99 at the end of the feed table. It lies with its belly uppermost and its tail toward but spaced somewhat distantly from the fish dressing machine, in position where it can be and will shortly be engaged at the severed neck portion a fish-advancing lug 9, which is secured positively to a link of a feeder chain 90 which is supported for movement in a horizontal plane, and lengthwise of the trough, upon a drive sprocket wheel 91 and an idler sprocket wheel 92. A second lug 9' is also fixed to a link of the chain, and the two lugs 9 and 9' engage respectively alternate fish, to advance them in the direction of the arrow which is shown in the vicinity of the tail of the fish in Figure 6. Only one lug, or several, might be employed, the object being to insure that a lug, or each lug if more than one, is in correct cyclic phase with the positive fish-delivering lugs 98 of the feed table, and with the positive fish-removing means 7 of the fish-dressing machine, at the time the lug or lugs 9 engage each fish. It is not to be understood that these elements 98, 9, and 7 move at the same rate; more probably each will advance at a different rate than the others, but each in turn engages and advances that fish which the preceding element has released, hence each is cyclically related to both others.

The drive sprocket wheel 91 on its shaft 93 is driven by drive means which advance at a steady rate and which are coordinated with the drive of the fish-dressing machine, and, in addition, with the drive of the feed table. Such drive means includes, or is represented by, a drive chain 1, driving in the direction of the arrow associated with that chain, and passing about a drive sprocket wheel 10 journaled upon a drive shaft 11 and clutched thereto by the separable clutch means 12, engagement of which is controlled by the handle 12'. The shaft 11 carries also gear 13, and rotates within a sleeve 40 to which are secured gears 43 and 45, and an arm 4.

In addition, but not shown in these diagrams, the drive chain drives the feed table, and it, or the means by which it is driven, drives the bull ring.

Through a countershaft 14, journaled in the outer end of the arm 4, and whereon are secured a gear 17 in mesh with gear 13, and 18, in mesh with a gear 52, is driven a shaft 5 which is in alignment with but separate from the shaft 11. The gear 52 is secured on this shaft 5, and drives the latter from the shaft 11 by way of the countershaft 14, and bevel gears 59 drive the shaft 93 from the shaft 5.

It will be seen that so long as the arm 4 and sleeve 40 remain, as they do ordinarily, in a fixed position—for instance, that position in which the arm is shown in Figure 6—rotation of the drive shaft 11 will rotate the shaft 14 and hence the shafts 5 and 93 at a speed ratio which is a function of the gear train connecting them with the drive shaft 11. This gearing is arranged to give an appreciable increase in speed in the feeder chain 90 over the drive chain 1. If, however, the arm 4 is permitted or caused to swing from such initial position clockwise about or relative to the shaft 11, the gear 18, instead of driving the gear 52, will to some degree climb around the latter, and the effective drive ratio between the chain 1 and the chain 90 will decrease, that is, the chain 90 will slow down, or even stop altogether.

Such movement of the arm 4 occurs ordinarily because of some resistance to advancement of the fish in the direction of the arrow adjacent it, in Figure 6, and since the arm 4 is fast upon the sleeve 40, such resistance causes the sleeve and the gears 43 and 45 to rotate clockwise from their initial position of rest shown in Figure 6. When that occurs the gear 43 rotates the meshing gear 30 in a sense to increase the tension in a spiral spring 3, thus building up an increasing resistance to continued rotation clockwise of the arm 4 and its associated parts. At the same time, the clockwise rotation of the gear 45 causes rotation of the meshing gear 41 from a position of rest, wherein its stop 47 engages a resilient but fixedly positioned stop 49. This gear 41 is mounted upon a jack shaft 42, whereon is also mounted a throw-out dog or cam 44. When these elements rotate thus clockwise, their rotation if continued to the utmost, will cause the cam 44 eventually to engage a pin 46 on the clutch control lever 12', and upon such engagement the clutch 12 will be thrown out, to discontinue the drive to the shaft 11 and, of course, to the feed chain 90. This is a safety measure, and ordinarily the movement of the parts 4, 41 and 44 does not continue to this extreme.

The mechanism so far described is quite similar, both in itself and in its relationship to the bull ring and to the header table, to that shown in my copending application Serial No. 5,817, now Patent No. 2,585,267 but the mechanism about to be described differs appreciably from anything therein shown.

The sprocket wheel 92 has been described as an idler, that is to say, it is rotated only as the chain 90, driven by the sprocket wheel 91, causes the sprocket wheel 92 to rotate. This sprocket wheel 92, carried upon a shaft 94, reacts through bevel gearing 94' to rotate a shaft 95 which carries a crank pin 96. This crank pin, therefore, rotates in accordance with and in coordinated cyclic relationship with the sprocket wheels 91 and 92. It is connected by a connecting rod 89 to the piston 8 of a dashpot, reciprocable within the cylinder 80, and its reciprocation therein is controlled by an adjustable release valve 82 in conjunction with a check valve 83. The check valve is freely open for the downstroke of the piston 8, but the release valve 82 is adjustable to a fine degree, and in particular with relation to the force of the spring 3, which also is adjustable, to impose a certain resistance to the piston's upward movement. Incidentally, the valves 82 and 83 are shown associated with the cylinder 80, but in actuality are associated with the piston 8 itself, as it is shown in Figure 5.

Resistance to upward movement of the dashpot piston 8 reacts through the positive drive to it to resist rotation of the idler sprocket wheel 92, and consequently to resist advance in the feed direction of the chain 90 and lug 9. This in turn reacts through the drive sprocket wheel 91 and the gearing 59, 52 and 18 to induce clockwise rotation of the arm 4 in opposition to the force of the spring 3, the force whereof is thereby increased. The coordination of these parts and the results achieved thereby will appear more clearly by study and comparison of the several Figures 6 to 11, inclusive, which represent one complete cycle.

As was indicated at the outset, Figure 6 shows the fish F just after it has dropped into the trough, in position to be engaged by the lug 9 after some further advance of the latter. All parts are in their position of rest, the stop 47 resting against the stop 49. An initial point on the drive chain 1 is indicated at 1a, and the corresponding initial position of the lug 9 is shown at 9a. Now, as the lug continues to advance under the driving force of the chain 1, it advances to the position 9b in Figure 7, and there encounters the fish with some appreciable force, sufficient to overcome the fish's inertia and its tendency to adhere to the trough, and to initiate its advance tail first toward the pick-up position at the bull ring. In the meantime, the drive chain 1 has advanced from its initial position 1a to its position 1b. The advance of the idler sprocket wheel 92 has not, so far, been resisted by the dashpot piston 8 for the reason that the crank pin 96 has advanced from the initial position 96a to the bottom center position 96b, and the check valve 83 does not close, on downward stroke, nor does the relief valve 82 by itself resist downward movement. The piston 8 has moved only a slight distance from the initial position 8a to the lowermost position 8b.

Nevertheless, the inertia of the fish reacts upon the lug 9 to hold it back somewhat, and this, in turn, reacts through the gearing previously described upon the arm 4 to cause it to rotate from the initial position 4a to the position 4b. This has increased the tension in the spring 3 by causing its movement from the initial position 3a to the position 3b, and the clutch throwout cam 44 and stop 47 have correspondingly rotated from initial positions 44a and 47a to the angularly spaced positions 44b and 47b respectively.

Now, as the fish gathers momentum there is a tendency for the spring 3 to react and to rotate the arm 4 counterclockwise, back to its initial position 4a. One result of this is to increase the speed of the chain 90 and lug 9 with respect to the speed of drive chain 1, so that in the time the drive chain has advanced from position 1b to position 1c, in Figure 8, the lug 9 has advanced from position 9b to position 9c. Now, however, the dashpot piston is on its upstroke, and the crank pin 96 has advanced from position 96b to 96c, and the piston 8 from position 8b to position 8c. The check valve 83 has closed, and the only relief is that afforded by the particular setting of the relief valve 82. The result is that the dashpot effectively and almost nonresiliently brakes the advance of the lug 9, particularly after a degree of compression has been achieved in the dashpot which corresponds to the position shown in Figure 8. The balancing of the tendency to relax the spring 3 and to resist the advance of the lug 9 by the dashpot 8 results in that the spring 3 remains at approximately the same tensioning as in Figure 7, and the throw-out cam 44 and stop 47 remain approximately in their attained positions 44b and 47b, respectively.

Figure 9:
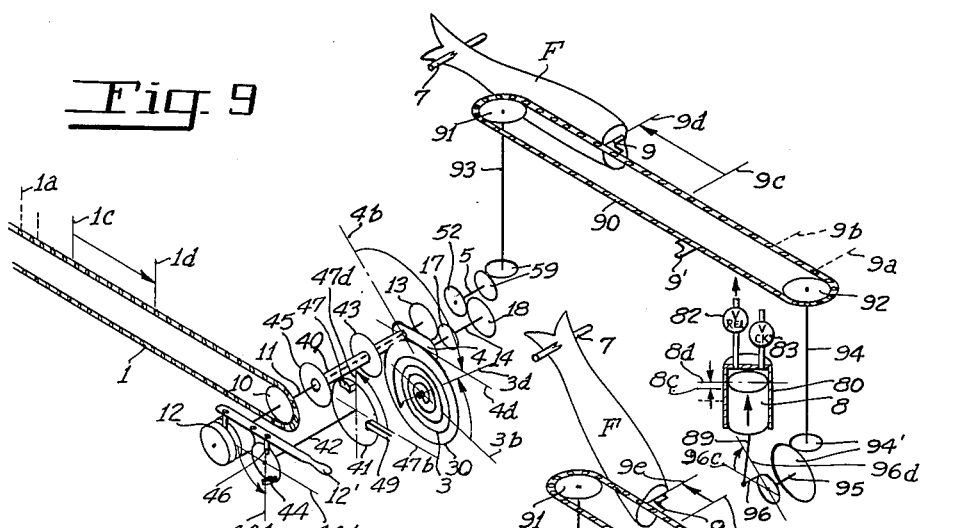

Coming now to Figure 9, it will be observed that the dashpot piston 8 has nearly reached top center position, where its resistance is the greatest. Nevertheless, due primarily to the resistance of the dashpot, and only in minor degree to the resistance of the fish, the spring 3 has been tensioned very materially with respect to its tensioning in Figures 7 and 8. The arm 4 has rotated from its position 4b to a position 4d. The spring has advanced from position 3b to position 3d, and the stop 47 and throw-out cam 44 have correspondingly advanced. The chain 9 has not halted its advance, but has merely slowed down its advance relative to the drive chain 1; for the advance of the drive chain 1 from position 1c to 1d, the chain 9 has advanced no more than from 9c to 9d, much less in comparison to the rate of advance of the chain 1 than its rate of advance illustrated in Figure 8. The fish F, whatever its size, by this time has reached the pick-up position, where its tail portion is halted in position to be engaged by the fish-halting means such as the stops 71, in position for engagement by the fish-engaging pins 7 of the bull ring. Enough freedom of movement has been left the dashpot piston 8, by the adjustment of the relief valve 82, to insure the full advancement of even the smallest fish likely to be handled, yet without imposing so much force on the largest fish to buckle them. The dashpot piston, approaching top center position, has advanced from position 8c to position 8d, and its movement is now sufficiently strongly resisted by the relief valve 82 that the advance of the lug 9 is strongly braked. Only sufficient force is acting upon each fish to advance it to the final pick-up position and to retain it there, and this is true almost without regard to the size of the fish. The force that would otherwise be applied by the spring 3 to the lug 9 and thence to the fish is resisted in the dashpot 8, and only a modicum of added resistance acting through the fish is required to halt the lug 9 altogether. This added force is insufficient to buckle even the weakest or flabbiest fish.

Figure 10:
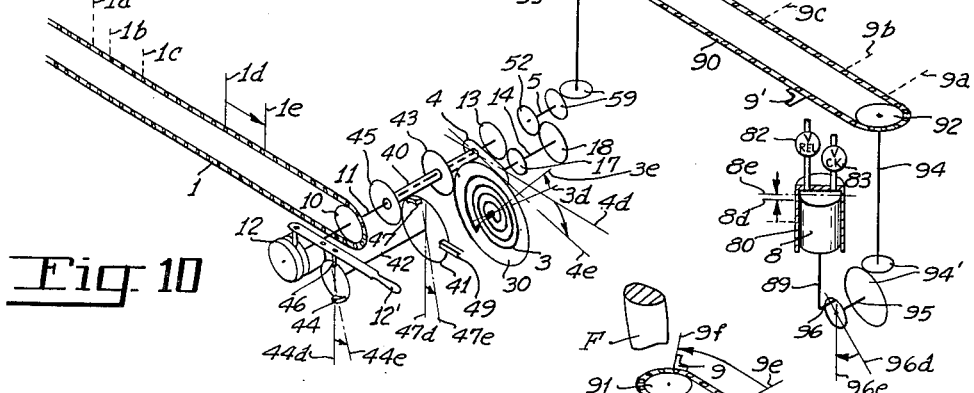

The bull ring is advancing quite rapidly, and the fish-engaging means 7 (assisted by other means to be mentioned hereafter) very quickly lifts the tail end of the fish, as is shown in Figure 10. Meanwhile, the added resistance of the fish being in process of diminution, the drive chain 1 is advancing from position 1d to position 1e, though the chain 90 and its lug 9 are advancing only a comparatively short distance from 9d to 9e. The dashpot piston is now reaching its top center position, advancing from position 8d to 8e, though still holding back on the lug 9. Sufficient advance of the lug is permitted to follow up the fish as its severed neck tends to follow, with increasing rapidity, along the trough in the path of its tail, and some slight braking effect is represented by the increased angular movement, still in the counterclockwise sense, of the arm 4 from position 4d to position 4e, with corresponding slight increase in the tension of the spring 3. The stop 47 departs farther from its position of rest and the throw-out cam 44 approaches closer to throw-out engagement with the pin 46.

Figure 11:
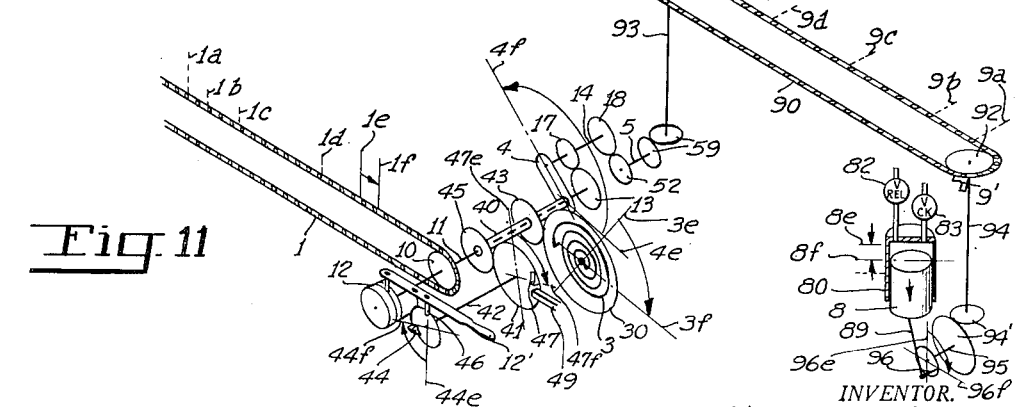

As the dashpot piston reaches top center position and starts downward, as shown in Figure 11, all restraint on the advance of the idler sprocket wheel 92 is removed, for now the check valve 83 is freely open. The accumulated force of the spring 3 now reacts, tending to rotate the arm 4 counterclockwise from its position 4e to a position 4f. The lug 9 from which the fish has been pulled away, and the paired lug 9' which was likewise held back, now advance freely and rapidly, primarily under the influence of the spring's force, from position 9e to position 9f, although the drive chain 1 has advanced only from position 1e to position 1f. In other words, the lugs are catching up, and before the piston 8 of the dashpot reaches its bottom center position the lugs 9 and 9' will have been restored to correctly-coordinated cyclic relationship with the remainder of the apparatus, particularly with relation to the steadily advancing chain 1. The stop 47 will have returned to its stopped position, or position of rest, and the throw-out cam 44 will have returned to its initial position, away from throw-out engagement with pin 46. Such movement of the parts is illustrated in Figure 11, and immediately thereafter parts return to the position of Figure 6. The lug 9' will be in correct position to engage the next fish deposited in the trough.

If fish are running large, the initial spring force may be lessened, or if they are running small, a heavier initial force will insure that the lug 9 advances farther towards the pick-up point against the accumulating resistance of the dashpot before the additional slight resistance of the halted fish brings the lug to a halt. An adjusting handle 31 (see Figures 1 and 2) connected to the inner end of the spring 3 through gear train 34, and movable relative to fixed dial 32, rotates shaft 33 one way or the other, to vary the spring's force. Moreover, the amount of resistance arising from braking of the dashpot can be varied, from slight to a quite appreciable value, by appropriate adjustment of the relief valve 82. These two adjustments, correctly coordinated, make it possible to handle all average sizes of fish likely to be cleaned thus, and to accommodate a rather wide departure on either side of any average size without incident.

The mechanical forms and cooperative relationship of the parts of the fish dressing machine, of the feed table, and of the resiliently yieldable means, clutch throw-out and the like, are rather clearly disclosed in my copending application Serial Number 5,817, now Patent No. 2,585,267, and in the other patents and application referred to at the outset. In consequence, the description which will be given at this point will be only sufficient to understand the relationship of the same to the dashpot or braking mechanism which primarily is the added feature in this disclosure.

Figure 2:
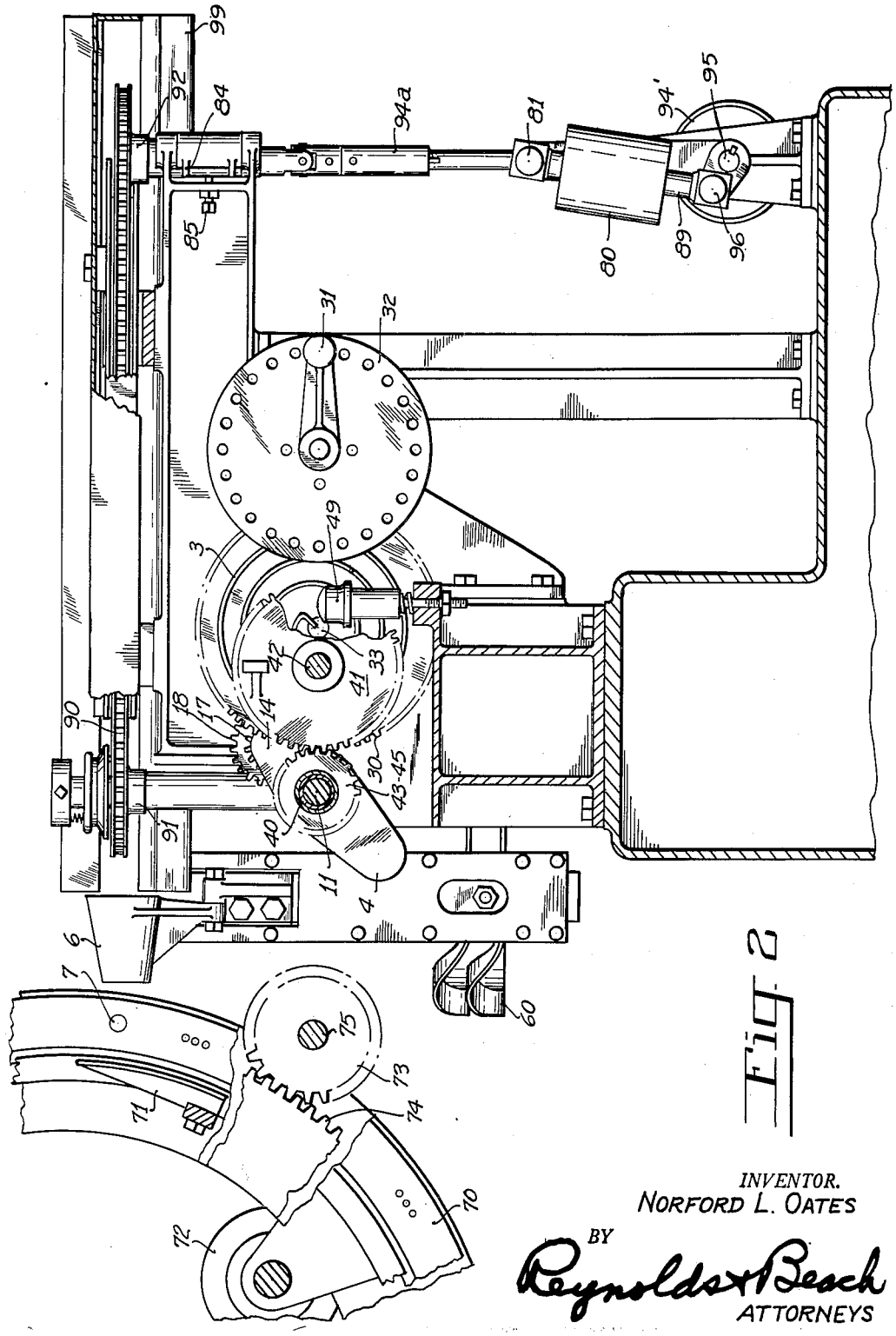
Figure 2 is a sectional elevation on the general line 2—2 of Figure 1.

The bull ring, shown best in Figures 1 and 2, consists generally of axially spaced rings 70 guided by and conjointly rotative about a circular path defined by rollers 72, rotation being accomplished by pinions 73 meshing with large bull gears 74. The pinions 73 are carried upon a shaft 75, whence the drive chain 1 takes off power. Fixed stops 71 are located inside the rings 70 to engage the tail of the fish as it arrives at the pick-up point, and the fish-engaging pins 7 are controlled by cam means 76 to engage and lift the fish by its tail as these pins arrive at the pick-up point. In addition a lifter 6 embraces the tail end of the fish at the pick-up point, just prior to its halting there, and is raised in proper synchronism with the immediately subsequent arrival there of the pins 7, to assist in lifting the fish, or at least its tail portion, through the initial part of its vertical movement. A cam 60 effects reciprocation of the lifter and is itself driven from the same general drive means in correctly coordinated phase relationship with the other mechanism.

The lugs 98 of the feed chain, moving lengthwise of the feed table 97, are arranged in a pattern to deliver each fish into the trough 99 at the terminus of the feed table, which trough is directed toward the pick-up point where are located the stops 71 and the lifter 6. The lugs 98 are likewise driven through the same drive mechanism, in proper coordination and phase relationship therewith.

Since it will be necessary to maintain precisely the correct tension in the chain 90, the same being located in a generally horizontal plane, it is desirable that its idler shaft 92 be mounted in a manner to permit some adjustment of its spacing relative to its drive shaft 93. To that end it is journaled upon arms 84, pivoted at 84', and the position of these arms is capable of a small degree of adjustment by the adjusting means 85; see Figure 2. However, because of this adjustment, the dashpot cannot be connected rigidly with the shaft 94 in the manner suggested in the diagrammatic Figures 6 to 11, but instead the connection is through an articulated shaft 94a (see Figures 2 and 3), the dashpot cylinder being pivotally mounted to the frame at 81. Moreover, the relief valve 82 and the check valve 83 are in practice incorporated within the piston 8, as may be best seen in Figure 5.

In many respects the present invention is similar to or may incorporate the structure shown in my copending application Serial No. 5,817, now Patent No. 2,585,267, and it is not believed that further detailed description is necessary at this point.

The description of the operation of the device has been given at the outset in conjunction with the diagrammatic figures, and it is believed that it is not necessary to repeat the same at this point, and that it will be obvious wherein and how the mechanical structures just described in detail will cooperate with the particular mechanism which is the subject matter of this invention.

I claim as my invention:

1. In a fish-advancing machine, in combination, a trough, a pusher guided for movement along said trough to advance successive fish therealong, drive means operable continuously at a constant speed through recurrent cycles, transmission mechanism operatively interconnecting said drive means and said pusher, and including resilient means yieldable upon the pusher or its pushed fish, at a predetermined point in the cycle, encountering a resisting force of predetermined minimum value, resistance-augmenting means, and means operatively connecting said resistance-augmenting means to said transmission mechanism to impose a resisting force upon said resilient means substantially in phase with the pusher encountering such resisting force, but of value less than such minimum value.

2. In a fish-advancing machine, in combination, a trough extending between a deposit point and a pick-up point, a pusher guided for recurrent movement along said trough to advance successive fish therealong, drive means operable continuously at a constant speed through recurrent cycles corresponding to the advance of successive fish, transmission mechanism operatively interconnecting said drive means and said pusher, and including resilient means yieldable upon the pusher or its pushed fish encountering a resisting force of predetermined minimum value, fish-halting means at the pick-up point positioned to engage and halt fish of a length in excess of a predetermined minimum length, at a predetermined point in the cycle, and thereby to impose a resisting force in excess of such minimum value, a resistance-augmenting means, and means operatively connecting said resistance-augmenting means to said transmission mechanism to impose cyclically a resisting force upon said resilient means substantially in phase with but independently of the imposition of a resisting force by an over-minimum-length fish, but itself of a value less than such predetermined minimum value.

3. The combination of claim 2, including means timed with the halting of a minimum-length fish by said fish-halting means to disable said resistance-augmenting means.

4. The combination of claim 2, including means timed with the halting of a minimum-length fish by said fish-halting means to remove such fish, and means timed with said fish-removing means to disable the resistance-augmenting means.

5. The combination of claim 2, including means to regulate the value of the resisting force imposed by said resistance-augmenting means.

6. The combination of claim 2, wherein a dashpot constitutes the resistance-augmenting means.

7. The combination of claim 2, including means to regulate the resilient means to vary the value of its resisting force.

NORFORD L. OATES.

REFERENCES CITED

The following references are of record in the file of this patent:

UNITED STATES PATENTS

| Number | Name | Date |
|---|---|---|
| 1,358,167 | Levin | Nov. 9, 1920 |
| 1,375,060 | Newdick | Apr. 19, 1921 |
| 1,653,906 | Heinbockel et al. | Dec. 27, 1927 |
| 1,736,517 | Baker | Nov. 19, 1929 |
| 2,005,589 | McCoy | June 18, 1935 |
| 2,086,070 | Dunn | July 6, 1937 |
| 2,240,214 | Heidelmeyer et al. | Apr. 29, 1941 |
| 2,245,329 | Danielsson | June 10, 1941 |
| 2,311,176 | Hutton | Feb. 16, 1943 |
| 2,355,226 | Mallory | Aug. 8, 1944 |
| 2,463,060 | Savrda et al. | Mar. 1, 1949 |